United States Patent
Lin

(10) Patent No.: US 7,614,909 B2
(45) Date of Patent: Nov. 10, 2009

(54) SUPPORT STAND FOR ELECTRONIC DEVICES

(75) Inventor: Chun-Ju Lin, Taipei County (TW)

(73) Assignee: Tek-Chain Technology Co., Ltd., Taoyuan (TW)

( * ) Notice: Subject to any disclaimer, the term of this patent is extended or adjusted under 35 U.S.C. 154(b) by 76 days.

(21) Appl. No.: 12/068,985

(22) Filed: Feb. 14, 2008

(65) Prior Publication Data

US 2009/0219674 A1 Sep. 3, 2009

(51) Int. Cl.
*H01R 13/60* (2006.01)

(52) U.S. Cl. ...................................... 439/528

(58) Field of Classification Search ................. 439/528, 439/501, 534; 362/414, 418, 429, 277, 282, 362/285

See application file for complete search history.

(56) References Cited

U.S. PATENT DOCUMENTS

| 558,904 | A | * | 4/1896 | Heck | 362/282 |
|---|---|---|---|---|---|
| 908,751 | A | * | 1/1909 | Cooke | 248/224.8 |
| 1,170,235 | A | * | 2/1916 | Fox | 248/283.1 |
| 1,243,490 | A | * | 10/1917 | Denhard | 38/82 |
| 1,287,092 | A | * | 12/1918 | Persons | 362/418 |
| 1,426,858 | A | * | 8/1922 | Godley | 362/418 |
| 2,035,991 | A | * | 3/1936 | Sinclair | 362/211 |
| 2,149,549 | A | * | 3/1939 | Reis | 439/6 |
| 2,691,721 | A | * | 10/1954 | Bornhuetter | 362/430 |
| 2,911,525 | A | * | 11/1959 | Strom | 362/309 |
| 4,195,894 | A | * | 4/1980 | Kotski | 439/101 |
| 4,337,508 | A | * | 6/1982 | Moffatt | 362/294 |
| 4,935,855 | A | * | 6/1990 | Narita | 362/286 |
| 5,101,333 | A | * | 3/1992 | Glassford | 362/413 |
| 5,103,384 | A | * | 4/1992 | Drohan | 362/191 |
| 5,110,303 | A | * | 5/1992 | Hardy | 439/367 |
| 5,611,513 | A | * | 3/1997 | Rosen | 248/222.11 |
| 5,860,824 | A | * | 1/1999 | Fan | 439/265 |
| 6,227,902 | B1 | * | 5/2001 | Lin | 439/534 |
| 6,305,973 | B1 | * | 10/2001 | Rosen | 439/534 |
| 6,509,678 | B2 | * | 1/2003 | Shen | 313/318.01 |
| 6,935,883 | B2 | * | 8/2005 | Oddsen, Jr. | 439/374 |
| 7,063,446 | B2 | * | 6/2006 | Deuter | 362/418 |
| 7,402,074 | B2 | * | 7/2008 | LeBlanc et al. | 439/409 |
| 7,484,866 | B1 | * | 2/2009 | Buse | 362/366 |
| 2003/0064623 | A1 | * | 4/2003 | Rowland et al. | 439/534 |
| 2006/0077672 | A1 | * | 4/2006 | Schaak | 362/418 |

* cited by examiner

*Primary Examiner*—T C Patel
*Assistant Examiner*—Vladimir Imas
(74) *Attorney, Agent, or Firm*—Muncy, Geissler, Olds & Lowe, PLLC

(57) ABSTRACT

The present invention discloses a support stand for electronic devices, and the support stand includes a base, a flexible support body connected to the base, a support stand connected to the support body, a resilient clamp installed onto the support stand, and an electric connector installed to the support body, and another end of the electric connector is passed through the base and connected to an electrical signal connector, such that the electrical signal connector can be connected to an external computer or another electronic device. A peripheral (such as a fan or a lamp) of a different size or specification can be replaced by extending or fixing the clamp, and the electronic device can obtain electric power through the electric connector. Further, the support body has the property of being bent flexibly, and thus the support body can be bent and fixed to a desired position.

10 Claims, 4 Drawing Sheets

SUPPORT STAND FOR ELECTRONIC DEVICES

BACKGROUND OF THE INVENTION

1. Field of the Invention

The present invention relates to a support stand for electronic devices, and more particularly to a support stand that fits an electronic device of a different size or specification and provides a convenient way of replacing the electronic device, and the support stand can be connected to an electrical signal connector of an external computer or another electronic device for supplying electric power to the computer or the electronic device, and the position of the electronic device on the support stand can be adjusted freely to improve the flexibility of the application.

2. Description of the Related Art

At present, there are many computer peripherals using USB connectors, particularly small electric appliances such as fans or lamps, whose structure includes a base, a circuit board installed in the base and connected to a USB electrical signal connector through an electric circuit, and the USB electrical signal connector is connected to a computer or any other electronic device with a power supply for supplying the required electric power, and the base has a coil pipe (which is a pipe that can be rotated and bent in different angles), and another end of the coil pipe is connected to the lamp or the fan, and the lamp or the fan is connected to the circuit board through the electric circuit. Although the coil pipe can be bent to adjust the angle, yet the lamp or the fan is fixed directly on the coil pipe, and thus a lamp or fan of a different specification or size cannot be replaced freely, and the application of the support stand is limited.

SUMMARY OF THE INVENTION

In view of the shortcomings of the prior art, the inventor of the present invention based on years of experience in the related industry to conduct extensive researches and experiments, and finally developed a support stand for electronic devices in accordance with the present invention to overcome the shortcomings of the prior art.

Therefore, it is a primary objective of the present invention to overcome the foregoing shortcomings of the prior art by providing a support stand that can fit electronic devices of different sizes and specifications, and provide a convenient way of replacing and fixing the electronic device onto the support stand. Further, the support stand can be bent and turned in different angles to adjust the desired installing position and improve the flexibility of the application.

Another objective of the present invention is to provide a support stand that uses an electrical signal connector (such as a USB or IEEE1394 connector) directly for connecting an external computer or an electronic device to obtain electric power for the required operations.

To achieve the foregoing objectives, the present invention provides a support stand for electronic devices, comprising: a base; an electrical signal connector extended outward from the base; a support body disposed on the base and having a good flexibility; a support stand disposed on another end of the support body, and having a corresponding resilient clamp, such that the electrical signal connector can be connected to an external computer or another electronic device for supplying electric power to the electronic device. The clamp can be extended or fixed to replace a peripheral (such as a fan or a lamp) of a different size or specification, and fix the peripheral onto the support stand. The support body can be bent freely to fix the peripheral at a desired position and improve the flexibility of the application.

To make it easy for our examiner to understand the objects, technical measures and performance of the present invention, preferred embodiments accompanied with the related drawings are used for a detailed description of the present invention.

DETAILED DESCRIPTION OF THE PREFERRED EMBODIMENTS

Figure 1:
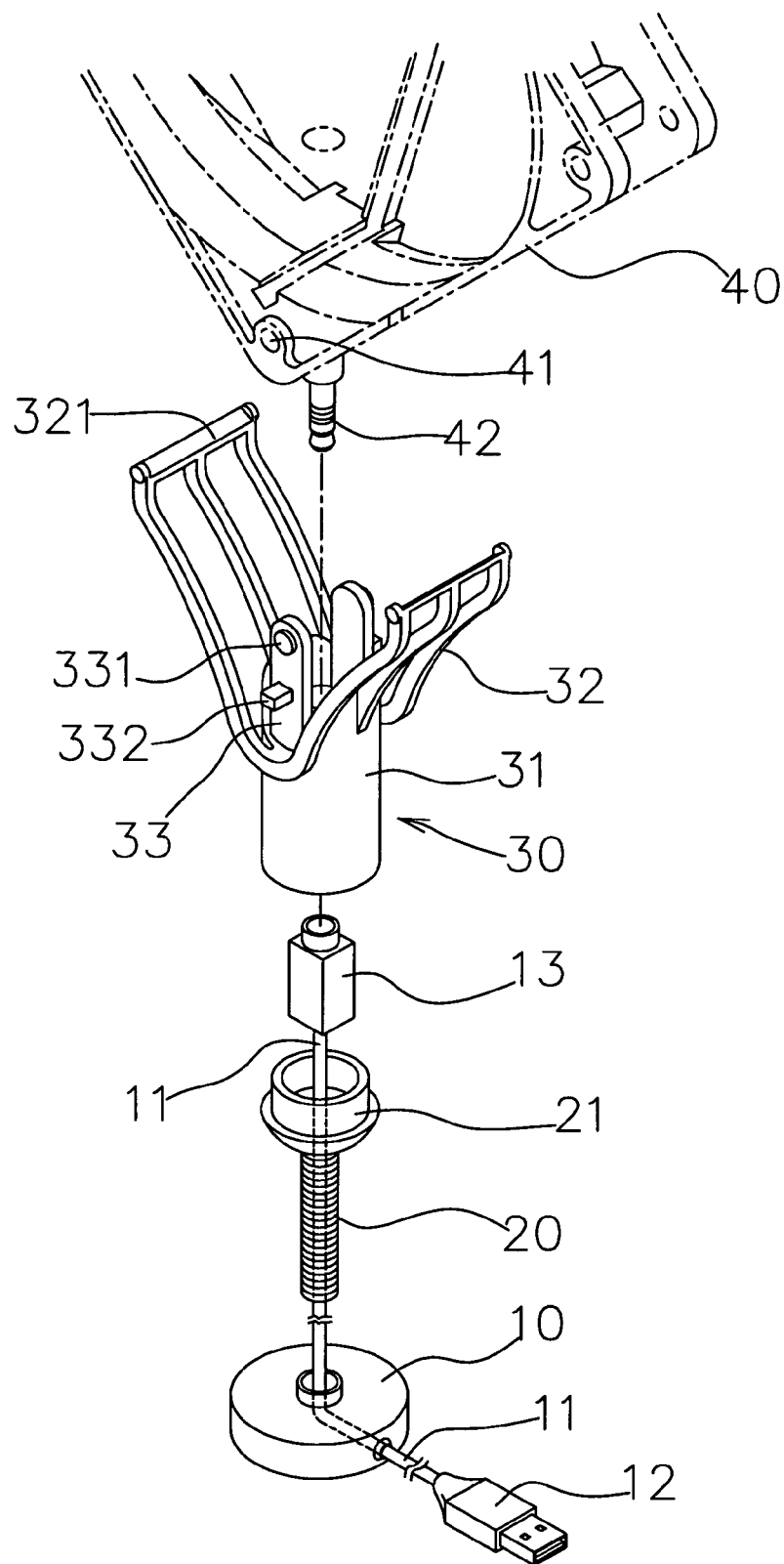
FIG. 1 is a perspective view of the invention.
Figure 2:
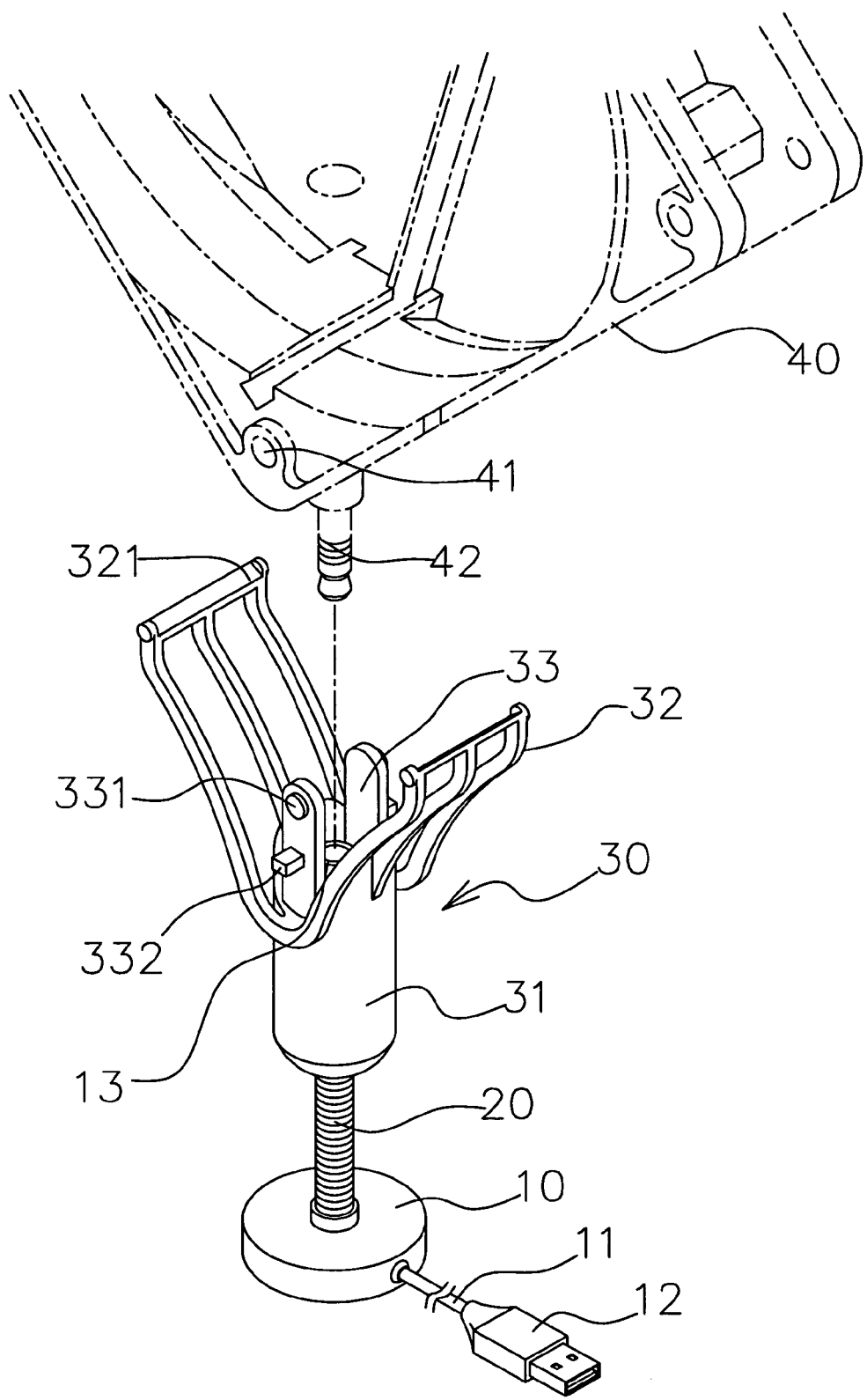
FIG. 2 is an exploded view of a first preferred embodiment of the invention.

Referring to FIGS. 1 and 2 for a support stand for electronic devices in accordance with the present invention, the support stand comprises: a base 10, which is a circular disc, but persons skilled in the art can use another device (such as an elastic clamp, a sucking disc or a magnetic disc) to substitute the circular disc; an electric circuit 11 installed in the base 10, an electrical signal connector 12 extended outward from an end connected to the electric circuit 11, which is a USB electrical signal connector in this embodiment, but persons skilled in the art can use an electrical signal connector of another specification to substitute the USB electrical signal connector; an electric connector 13 connected to another end; a flexible support body 20 coupled onto the base 10, which is a coil pipe in this embodiment, but persons skilled in the art can use another device to substitute the coil pipe, and the support body 20 being hollow inside for passing the electric circuit 11 connected to the electric connector 13; a bushing 21 connected to another end of the support body 20, and having a support stand 30 and a sleeve 31 disposed on the support stand 30, such that an end of the sleeve 31 can be sheathed onto the bushing 21 and rotated freely thereon, and the sleeve 31 is contained precisely in the electric connector 13; corresponding clamps 32 disposed on another end of the sleeve 31, and having a resilience for extending outward into a specific clamping angle (which is in an V-shape in this embodiment); a concave groove 321 disposed on the top of the clamps 32; a fixing element 33 installed between the corresponding clamps 32 on the sleeve 31 and extended upward, and having a resilient effect, and the fixing element 33 further comprising a latch element 331 and a manual control member 332 (which are inwardly and outwardly protruded members in this embodiment) disposed on the corresponding the fixing element 33.

Figure 3:
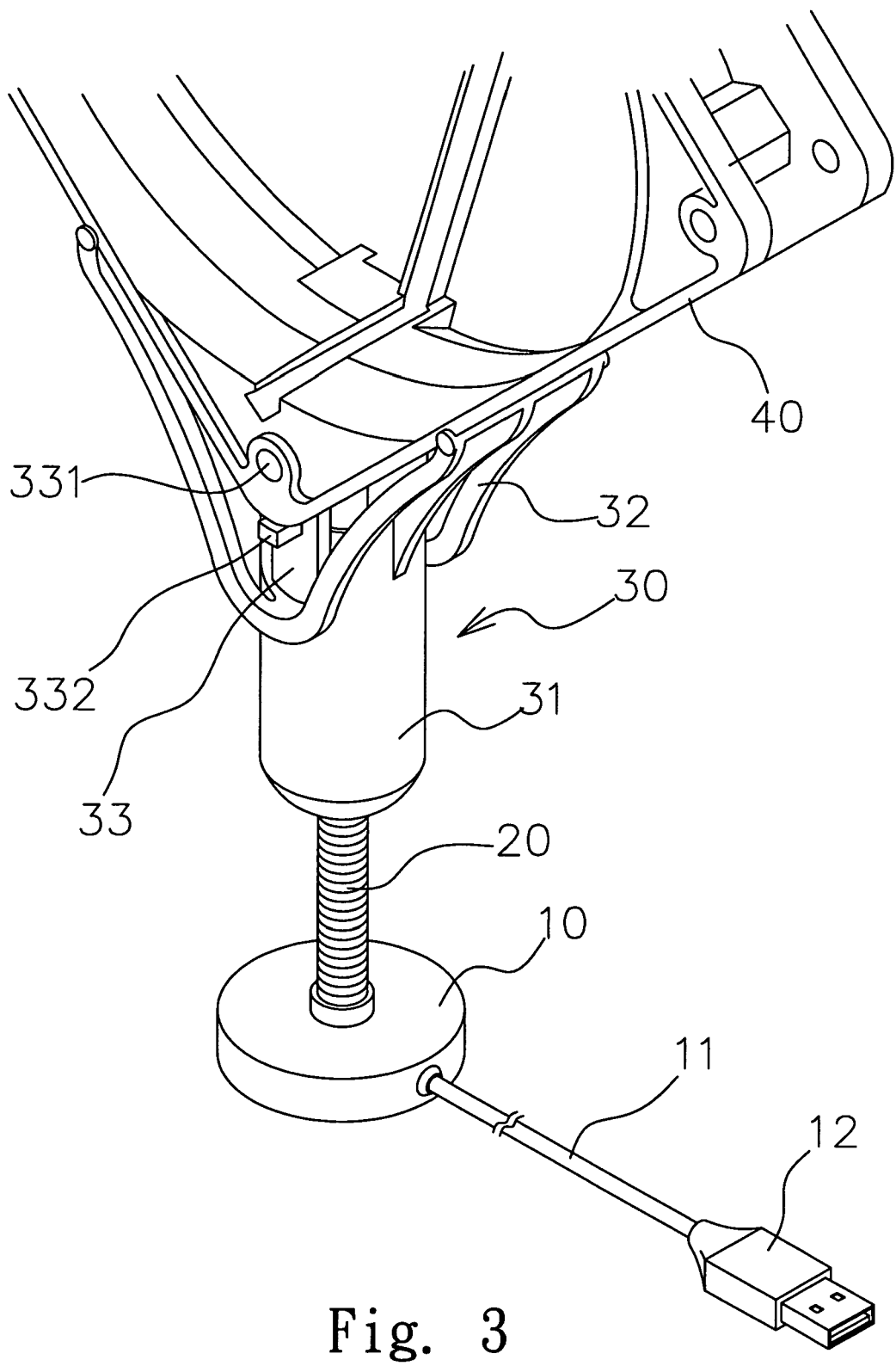
FIG. 3 is a perspective view of a first preferred embodiment of the invention.

In FIGS. 1 to 3, the clamps 32 clamp a fan 40, and the fan 40 has a snap 41 (which is a through hole in this embodiment) disposed separately on both sides of one of the distal edges. During installation, the edge of the fan 40 is embedded directly into the groove 321 of the clamp 32, and pressed inward by the corresponding manual control member 332, such that the snap 41 is engaged with the latch element 331, and the resilience of the fixing element 33 fixes the fan 40 onto the support stand 30. Further, the fan 40 has an electric connector 42 in contact with electric connector 13 to constitute an electric connection.

Figure 4:
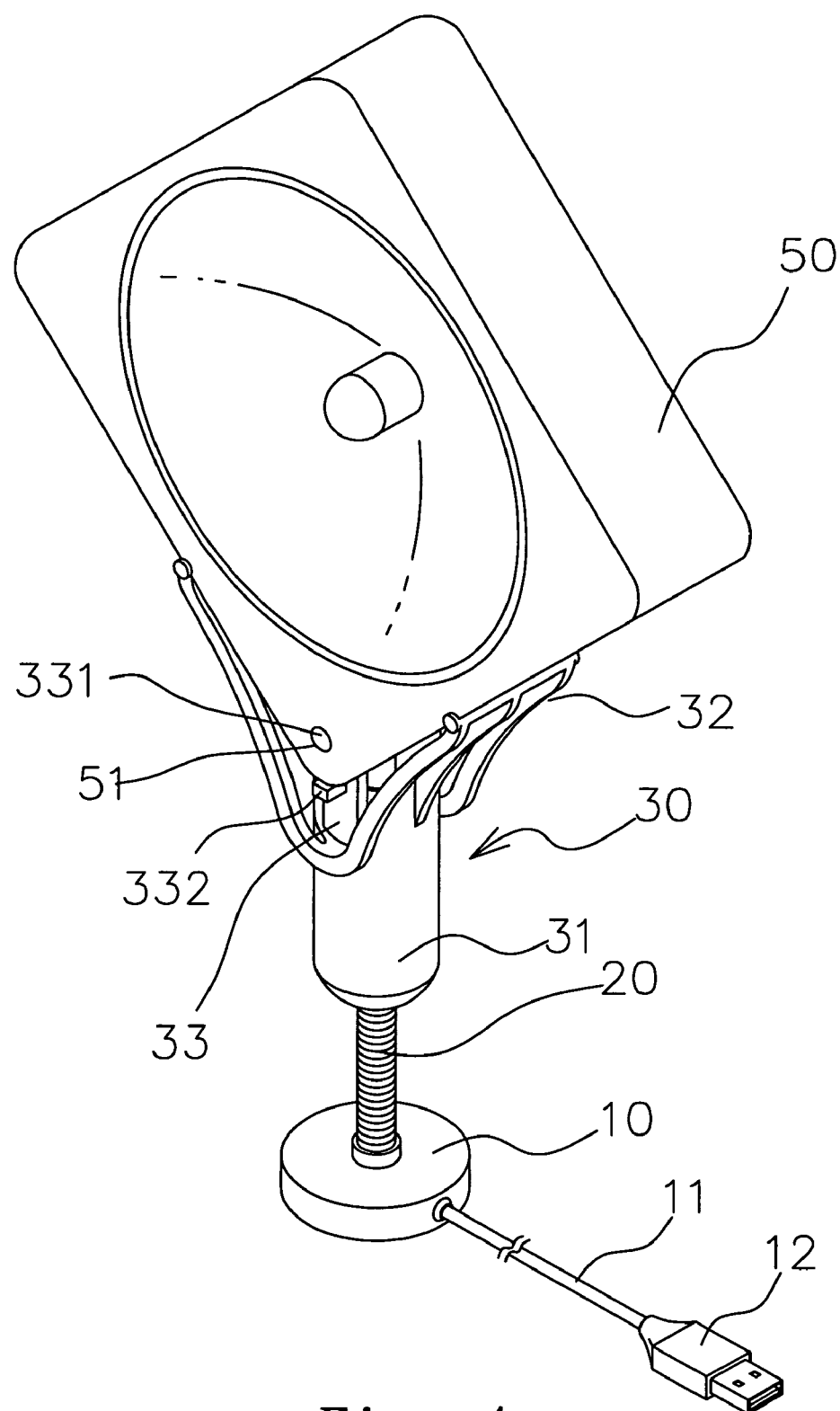
FIG. 4 is a perspective view of a second preferred embodiment of the invention.

Referring to FIG. 4 for a second preferred embodiment of the present invention, the fan 40 can be replaced by a lamp 50, and the lamp 50 also has a snap 51 and an electric connector (not shown in the figure), and the edge of the lamp 50 is embedded directly into the groove 321 of the clamp 32, and pressed inward by the corresponding manual control member 332, such that the snap 51 is engaged with the latch element 331, and the resilience of the fixing element 33 fixes the lamp 50 onto the support stand 30, and the electric connector of the lamp 50 is in contact with the electric connector 13 in the sleeve 31 to constitute an electric connection.

In FIGS. 3 and 4, the equipment (such as the fan or lamp) is embedded into support stand 30, and the clamp 32 is clamped to an edge of the equipment, and then the snap 41, 51 and the latch element 331 are provided for fixing the fan 40 or the lamp 50 onto the support stand 30, and the fan 40 or lamp 50 has an electric connector 42 in contact with the electric connector 13 (not shown in the figures), and connected to the electrical signal connector 12 which is electrically signal connected to an external computer or an other electronic device to constitute an electric connection. With the support stand 30, the sleeve 31 can be turned freely to any angle, and the fan 40 or lamp 50 can be turned to a desired direction, and the support body 20 can be bent to adjust the height and angle in order to fit a peripheral of a different specification. The clamps 32 are provided for fixing the peripheral, and the electric connector 13 is connected to an external computer or any other electronic device for supplying electric power to the external computer or the other electronic device, and the positions of the support stand 30 and the support body 20 can be adjusted freely to give a more flexible application.

In summation of the description above, the invention provides a support stand for electronic devices that comes with a simple overall structure for any type of computers and provides an easy installation and a convenient use. Obviously, the invention improves over the prior art and complies with the requirements of patent application, and thus is duly filed for patent application.

While the invention has been described by means of specific embodiments, numerous modifications and variations could be made by those skilled in the art without departing from the scope and spirit of the invention set forth in the claims.

| | |
|---|---|
| base | 10 |
| electric circuit | 11 |
| electrical signal connector | 12 |
| electric connector | 13 |
| support body | 20 |
| bushing | 21 |
| support stand | 30 |
| sleeve | 31 |
| clamp | 32 |
| groove | 321 |
| fixing element | 33 |
| latch element | 331 |
| manual control member | 332 |

-continued

| | |
|---|---|
| fan | 40 |
| snap | 41 |
| electric connector | 42 |

What is claimed is:

1. A support stand for electronic devices, comprising:
   a base;
   an electrical signal connector, extended outward from said base, and adapted to be coupled to an external computer or another electronic device;
   a support body, coupled onto said base, and said support body being flexible and capable of being bent flexibly;
   a support stand, having a sleeve with an end sheathed onto said support body, and capable of turning freely in any angle on said support body, and another end of said sleeve having a corresponding clamp, and said clamp being flexible and capable of extending outward to form a specific clamping angle, and said support stand having an electric connector passing through said support body from said base;
   a corresponding fixing element, installed between said clamps of said sleeve, and extended upward, and said fixing element having a resilient effect;
   at least one latch element, installed on said fixing element, for latching said electronic device through said latch element;
   at least one manual control member, installed on said fixing element, for separating said electronic device from said fixing element by pressing said manual control member.

2. The support stand for electronic devices according to claim 1, wherein said base is a sucking disc.

3. The support stand for electronic devices according to claim 1, wherein said base is an elastic clamp base.

4. The support stand for electronic devices according to claim 1, wherein said base is a magnetic disc.

5. The support stand for electronic devices according to claim 1, wherein said support body is a coil pipe capable of being wound freely in any angle.

6. The support stand for electronic devices according to claim 1, wherein said electronic device is a fan.

7. The support stand for electronic devices according to claim 1, wherein said electronic device is a lamp.

8. The support stand for electronic devices according to claim 1, wherein said support stand is in an V-shape.

9. The support stand for electronic devices according to claim 6, wherein said electronic device comprises an electric connector and a snap thereon, and said latch element of said fixing element is adapted to be affixed to said snap.

10. The support stand for electronic devices according to claim 7, wherein said electronic device comprises an electric connector and a snap, and said latch element of said fixing element is adapted to be affixed to said snap.

* * * * *